US010227046B2

(12) United States Patent
Habibi (10) Patent No.: US 10,227,046 B2
(45) Date of Patent: Mar. 12, 2019

(54) SUN VISOR AND VANITY MIRROR ASSEMBLY FOR VEHICLE

(71) Applicant: MAGNA MIRRORS OF AMERICA, INC., Holland, MI (US)

(72) Inventor: Hamid Habibi, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 600 days.

(21) Appl. No.: 14/921,109

(22) Filed: Oct. 23, 2015

(65) Prior Publication Data

US 2016/0114731 A1 Apr. 28, 2016

Related U.S. Application Data

(60) Provisional application No. 62/068,857, filed on Oct. 27, 2014.

(51) Int. Cl.

| B60R 1/08 | (2006.01) |
|---|---|
| B60J 3/02 | (2006.01) |
| G02F 1/153 | (2006.01) |
| G06F 3/041 | (2006.01) |
| B60J 3/04 | (2006.01) |
| B60Q 3/258 | (2017.01) |

(52) U.S. Cl.
CPC ............. *B60R 1/088* (2013.01); *B60J 3/0282* (2013.01); *B60J 3/04* (2013.01); *B60Q 3/258* (2017.02); *G02F 1/153* (2013.01); *G06F 3/041* (2013.01)

(58) Field of Classification Search
CPC ............ B60J 3/0204; B60J 3/04; B60R 1/088

USPC ............................................... 296/97.1, 97.2
See application file for complete search history.

(56) References Cited

U.S. PATENT DOCUMENTS

| 5,525,264 A | 6/1996 | Cronin et al. |
| 5,594,222 A | 1/1997 | Caldwell |
| 5,610,756 A | 3/1997 | Lynam et al. |
| 5,668,663 A | 9/1997 | Varaprasad et al. |
| 5,724,187 A | 3/1998 | Varaprasad et al. |
| 6,154,306 A | 11/2000 | Varaprasad et al. |
| 6,178,034 B1 | 1/2001 | Allemand et al. |
| 6,310,611 B1 | 10/2001 | Caldwell |
| 6,320,282 B1 | 11/2001 | Caldwell |
| 6,449,082 B1 | 9/2002 | Agrawal et al. |
| 6,627,918 B2 | 9/2003 | Getz et al. |
| 6,690,268 B2 | 2/2004 | Schofield et al. |
| 7,184,190 B2 | 2/2007 | McCabe et al. |
| 7,195,381 B2 | 3/2007 | Lynam et al. |

(Continued)

*Primary Examiner* — Jason S Daniels
(74) *Attorney, Agent, or Firm* — Honigman LLP (57) ABSTRACT

A sun visor assembly for a vehicle includes a front transparent glass substrate having first and second surfaces and a rear transparent glass substrate having third and fourth surfaces, with an electro-optic medium sandwiched between the second surface of the front glass substrate and the third surface of the rear glass substrate. A vanity mirror including a mirror reflector is established at one of (i) the first surface of the front glass substrate and (ii) the second surface of the front glass substrate. When not electrically powered, the electro-optic medium is substantially transparent, and when electrically powered, the electro-optic medium is darkened so as to have reduced light transmission. When the electro-optic medium behind the mirror reflector is darkened, the mirror reflector is usable as a vanity mirror by a user of the sun visor.

20 Claims, 8 Drawing Sheets

(56) References Cited

U.S. PATENT DOCUMENTS

| | | |
|---|---|---|
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,360,932 B2 | 4/2008 | Uken et al. |
| 7,446,924 B2 | 11/2008 | Schofield et al. |
| 7,626,749 B2 | 12/2009 | Baur et al. |
| 8,276,409 B2 | 10/2012 | Tooker |
| 8,503,061 B2 | 8/2013 | Uken et al. |
| 8,508,831 B2 | 8/2013 | De Wind et al. |
| 8,730,553 B2 | 5/2014 | De Wind et al. |
| 8,827,347 B2 | 9/2014 | Snider |
| 9,176,357 B2 * | 11/2015 | Lam .................. B60J 3/04 |
| 9,346,403 B2 | 5/2016 | Uken et al. |
| 9,539,883 B2 | 1/2017 | Snider et al. |
| 9,598,016 B2 | 3/2017 | Blank et al. |
| 9,827,913 B2 | 11/2017 | De Wind et al. |
| 2006/0050018 A1 | 3/2006 | Hutzel |
| 2011/0273659 A1 | 11/2011 | Sobecki et al. |
| 2013/0161971 A1 * | 6/2013 | Bugno .................. B60J 3/04 296/97.2 |
| 2014/0097636 A1 | 4/2014 | Snider et al. |
| 2014/0141194 A1 | 5/2014 | Lynam |

\* cited by examiner

SUN VISOR AND VANITY MIRROR ASSEMBLY FOR VEHICLE

CROSS REFERENCE TO RELATED APPLICATION

The present application claims the filing benefits of U.S. provisional application Ser. No. 62/068,857, filed Oct. 27, 2014, which is hereby incorporated herein by reference in its entirety.

FIELD OF THE INVENTION

The present invention relates generally to the field of sun visor assemblies for vehicles and, more particularly, to sun visors that include a vanity mirror.

BACKGROUND OF THE INVENTION

Sun visors for vehicles are typically plastic and/or fabric visors that flip or pivot between a raised or stowed position, where the sun visor is generally along the roof of the vehicle, and a lowered or use position, where the sun visor is flipped down to shield the driver's or passenger's eyes from sunlight ahead of the vehicle. Typically, sun visors include a vanity mirror so that, when the driver (or passenger) flips the visor down to the use position, the vanity mirror is viewable at the visor. Often, such vanity mirrors include or are associated with lights to illuminate the viewer's face.

SUMMARY OF THE INVENTION

The present invention provides a sun visor that comprises an electro-optic element or cell or device that has two glass substrates and an electro-optic medium sandwiched between the glass substrates. Darkening of the electro-optic medium (via energizing electrically conductive coatings at the opposed surfaces of the glass substrates such as known in interior rearview mirrors) darkens the sun visor or reduces the transmissivity of light through the sun visor so that light is attenuated and at least partially does not pass through the sun visor. The sun visor includes a vanity mirror that comprises a partially transmissive and partially reflective mirror reflector coating disposed at a vanity mirror region of a second surface of the sun visor, such that, when the sun visor is darkened, the vanity mirror becomes more visible and reflective to the person viewing the sun visor. Because the vanity mirror is incorporated into the sun visor, the sun visor and vanity mirror assembly provides a seamless sun visor with no separate vanity mirror protruding from or disposed at the sun visor.

These and other objects, advantages, purposes and features of the present invention will become apparent upon review of the following specification in conjunction with the drawings.

DESCRIPTION OF THE PREFERRED EMBODIMENTS

Figure 1:
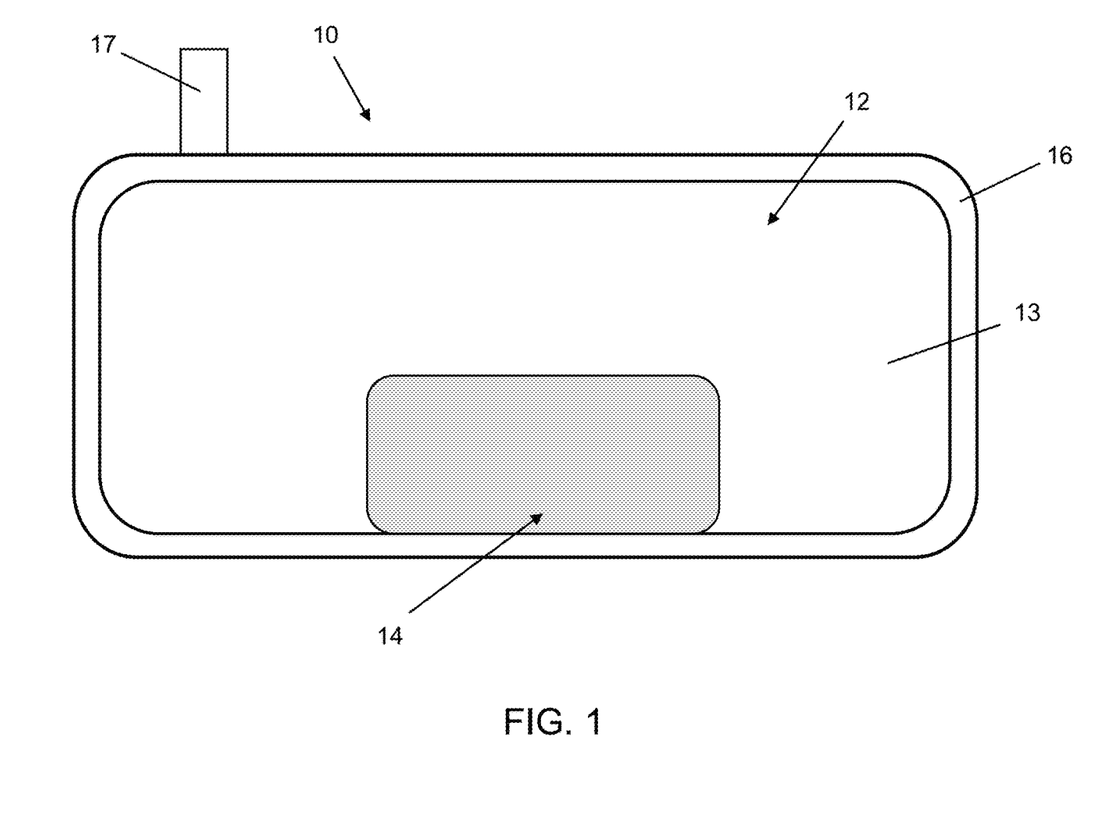
FIG. 1 is a plan view of a sun visor in accordance with the present invention.

Referring now to the drawings and the illustrative embodiments depicted therein, sun visor 10 for a vehicle includes an electro-optic cell or device 12 that is adjustably mounted at a vehicle and that is adjustable between a raised or stowed position, where the sun visor is generally along the roof of the vehicle, and a lowered or use position, where the sun visor is flipped down (FIG. 1). When the sun visor is flipped down, the electro-optic cell may be powered or energized to darken the sun visor to shield the driver's or passenger's eyes from sunlight ahead of the vehicle. The sun visor includes a principal or sun visor portion or region 13 and a vanity mirror or mirror portion or vanity mirror region 14 that is reflective when the sun visor (at the mirror region) is at least partially darkened, as discussed below. The sun visor comprises a variable darkening cell or element that varies its light transmissive responsive to electrical current applied to conductive coatings or layers of the cell or device.

Optionally, the sun visor glass assembly may be encompassed or circumscribed by a casing or bezel or frame element 16, which is then pivotally or adjustably mounted at the header or roof of the vehicle, such as via any suitable mounting construction 17. The casing or bezel circumscribes the glass assembly or cell 12 that provides the sun visor region 13 and vanity mirror region 14. The user may then flip or pivot the sun visor 10 between a raised or stowed position, where the sun visor assembly is generally along the roof of the vehicle, and a lowered or use position, where the sun visor assembly is flipped down whereby, when the electro-optic medium of the glass assembly or cell is darkened, the sun visor attenuates light to shield the driver's or passenger's eyes from sunlight ahead of the vehicle. Wiring for electrically powering the electro-optic cell of the sun visor may be routed through or along the mounting construction 17 to electrically connect the electro-optic cell or glass assembly of the sun visor to a power source and/or control of the vehicle. For example, the wire harness or wiring may electrically connect to a user input in the vehicle remote from the sun visor (such as at a steering wheel of the vehicle or the like), whereby a user may actuate the input to cause the sun visor to pivot to its use or non-use position and/or to vary the darkening of the electro-optic cell for use of the sun visor feature or vanity mirror feature or both.

Figure 2:
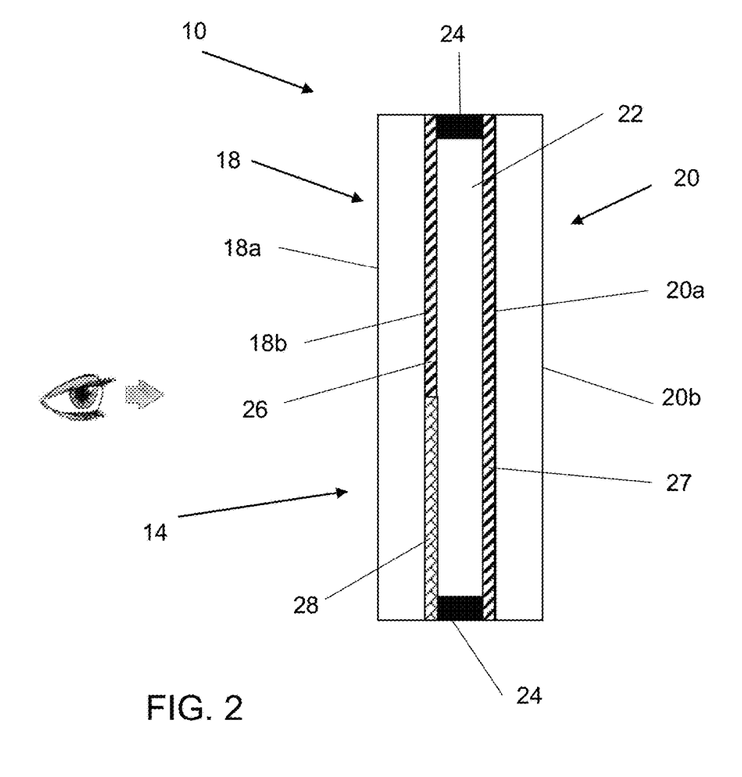
FIG. 2 is a sectional view of the sun visor of FIG. 1.

In the illustrated embodiment, and as shown in FIG. 2, the electro-optic cell or device 12 of sun visor 10 comprises a laminate construction variable transmissive electro-optic (such as electrochromic) cell or device or assembly having a front glass substrate 18 and a rear glass substrate 20 with an electro-optic medium 22 (such as electrochromic medium) sandwiched therebetween and bounded by a perimeter seal 24. As shown in FIG. 2, front substrate 18 has a front or first surface 18a (the surface that generally faces the driver of a vehicle when the sun visor assembly is normally mounted at the vehicle) and a rear or second surface 18b opposite the front surface 18a, and rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element (such as is known in the electrochromic mirror art).

The second surface 18a and the third surface 20a both have a transparent conductive coating 26, 27 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (10) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety).

In the illustrated embodiment, the vanity mirror 14 comprises a metallic reflector coating 28 (or multiple layers or coatings) established at the second surface 18b of the front substrate 18. Optionally, the metallic reflector coating 28 of the vanity mirror may be disposed at the first or front surface 18a of the front substrate. As shown in FIG. 2, the metallic reflector coating 28 is disposed at the vanity mirror portion or region of the sun visor. The metallic reflector coating 28 is partially reflective and partially transmissive. For example, the metallic reflector coating may be substantially transmissive, such as at least about 50 percent transmissive or such as at least about 60 percent transmissive or such as at least about 70 percent transmissive, while also being partially reflective, such as less than about 40 percent reflective of light incident thereat or such as less than about 30 percent reflective of light incident thereat or such as at least about 20 percent reflective of light incident thereat.

The conductive coatings 26, 27 are in contact with the electro-optic medium and define the active EC area or surface of the sun visor within the perimeter seal 24. The coatings may be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties. Thus, when the bus-bars or clips are electrically powered, the coatings 26, 27 are energized or powered and the electro-optic medium is darkened to attenuate or limit or substantially block light transmission through the sun visor.

Optionally, the front substrate may include an opaque or substantially opaque or reflective or hiding perimeter layer or coating or perimeter band at its rear or second surface that substantially hides the perimeter seal from view to a person viewing the sun visor from in the vehicle (and thus facing the front substrate of the sun visor), and optionally, the rear substrate may also include a perimeter band at its front or third surface to substantially hide the perimeter seal from view to a person viewing the sun visor from outside the vehicle (and thus facing the rear substrate of the sun visor). The perimeter band or bands may be reflective or not reflective and may utilize aspects of the perimeter bands described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties.

Thus, when a person is viewing the sun visor 10 (such as when the sun visor is flipped down) and the electro-optic cell or device of the sun visor is not powered, light from forward of the vehicle passes through the sun visor so that the viewer can view ahead of the vehicle through the sun visor. When the electro-optic cell is in its non-powered and thus substantially transparent state, the vanity mirror is not readily viewable to the viewer, due to the substantially transmissive property of the mirror reflector coating. The vanity mirror may be discernible to a person viewing the mirror and sun visor when the mirror region is unpowered due to different tints or colors of the coatings, but the unpowered mirror region will be substantially transparent. However, when the electro-optic cell of the sun visor is powered so that the electro-optic medium (including the portion of the electro-optic medium behind the vanity mirror coating) is darkened, the reflective properties of the mirror are readily apparent and the mirror is viewable to the person viewing the sun visor from inside the vehicle. The sun visor may be adjustably mounted at the header or roof of the vehicle (and flipped between its raised or non-use position and its lowered or use position) or the sun visor and vanity mirror assembly or construction may be integrated at an upper region of the vehicle windshield (and optionally at an upper region of the forward side windows of the vehicle as well).

The mirror reflector coating 28 at the rear or second surface 18b of the front substrate 18 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector coating may be a separate coating disposed at the second surface and at an area or region that is devoid of the transparent conductive coating (such as shown in FIG. 2) or the mirror reflector coating may be disposed over or under the transparent conductive coating, with the transparent conductive coating covering at least substantially the entirety of the second surface of the front glass substrate. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties.

Optionally, the vanity mirror region of the electro-optic cell or element may be separately energized, such that the vanity mirror may be used even though the rest of (the sun visor region of) the electro-optic cell of the sun visor is not energized and is thus substantially transparent. For example, the mirror reflector coating 28 may be electrically isolated from the transparent conductive coating 26, such that the mirror reflector coating, when powered, results in darkening of the electro-optic medium at the area at and behind the mirror reflector coating, such that the vanity mirror is viewable while the rest of the sun visor may remain unpowered and transparent. For example, the mirror reflector coating 28 may be electrically isolated from the transparent conductive coating 26 via isolation lines or gaps between the coatings at the second surface.

Figure 3:
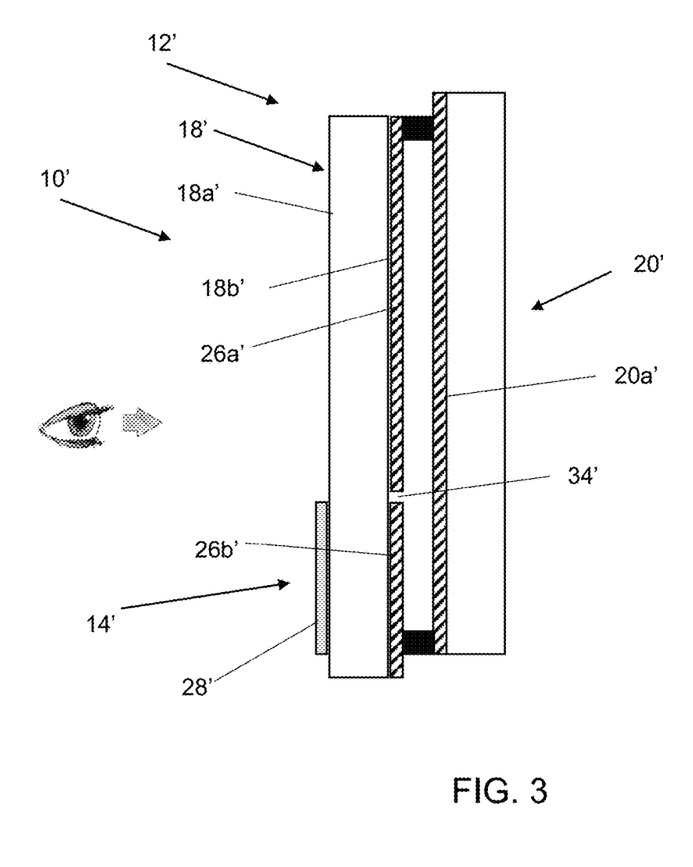
FIG. 3 is another sectional view of a sun visor and vanity mirror of the present invention.

Optionally, for example, and such as shown in FIG. 3, a sun visor 10' may have its mirror reflector coating 28' disposed at the first or front surface 18a' of the front substrate 18' (to establish the vanity mirror or mirror region 14') of the electro-optic cell 12', and the transparent conductive coating at the second surface 18b' of the front substrate may comprise a principal visor region 26a' and a mirror region 26b', which is preferably electrically isolated (such as via laser ablated isolation lines 34' established through the coating) from the principal visor region 26a'. The reflector coating for the vanity mirror may comprise a thin metallic reflector film or coating deposited on the first or second surface or it may comprise a metalized thin film adhered to the first surface of the front substrate.

Figure 4:
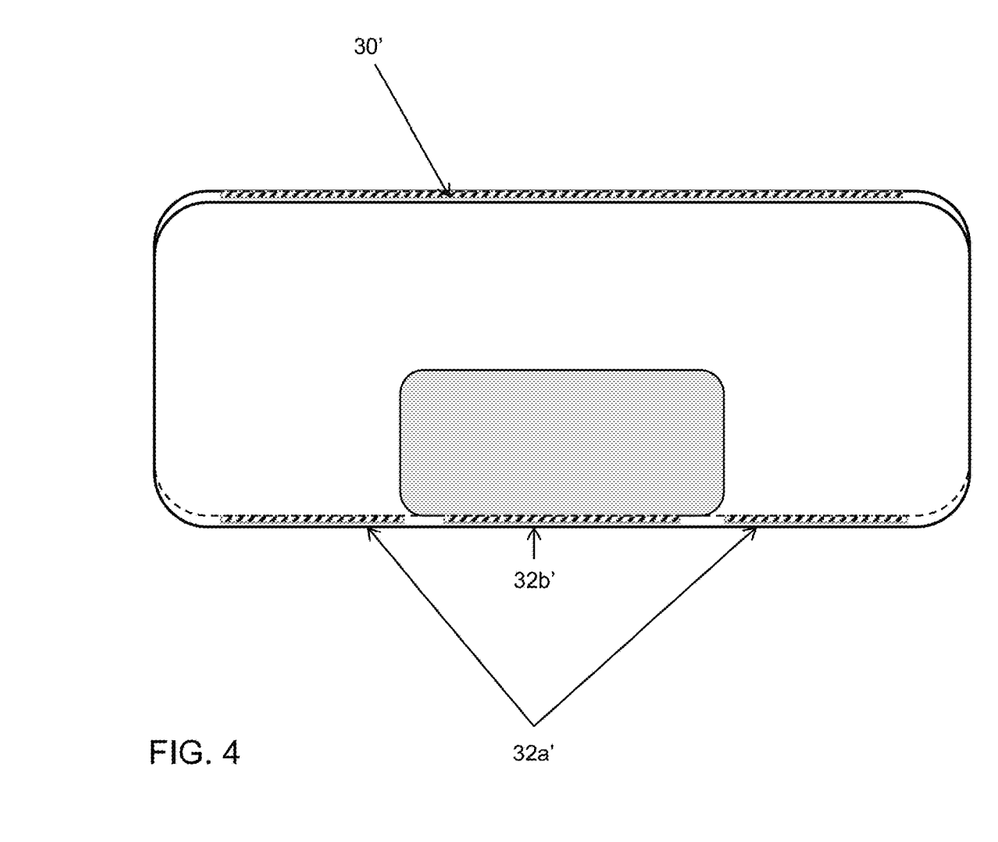
FIG. 4 is a plan view of another sun visor of FIG. 3, showing the electrical contacts for electrically connecting to the sun visor.

As shown in FIG. 3, the cell or glass assembly of the visor may comprise two ITO (or other transparent electrically conductive coatings or layers) coated glass substrates offset relative to one another so that their electrical contact portions are exposed at the respective overhang regions of the front and rear substrates (such as shown in FIG. 4 and such as by utilizing aspects of the mirror reflective elements described in U.S. Pat. Nos. 7,274,501; 7,184,190 and/or 7,255,451, which are hereby incorporated herein by reference in their entireties). As shown in FIG. 4, the electrical contacts 30' for electrically connecting (such as from an electrical connector or lead of a wire or wire harness of the vehicle) to the coating 27' at the third surface 20a' of the rear substrate 20' are along the upper overhang region, while the electrical contacts 32a' for the visor portion coating 26a' and the contacts 32b' for the mirror portion coating 26b' are along the lower overhang region. The contacts 32a' to the second surface conductive coating of the visor region may wrap onto both sides to improve coloration or darkening of the electro-optic medium across the sun visor. The window region and the mirror region thus are on separate circuits so that they can be individually colored and bleached. The ITO laser ablation lines or isolation lines or gaps 34' (FIG. 3) may be on one surface coating, such as on the coating at the rear or second surface 18b' of the front substrate 18', or may be made at both surfaces, such that both of the transparent conductive coatings (at the rear or second surface 18b' of the front substrate 18' and at the front or third surface 20a' of the rear substrate 20') have the mirror region electrically isolated from the principal visor region. Optionally, and desirably, the two regions (the visor region and mirror region) may be physically separated or demarcated, such as by a sealing element disposed along the isolation line and separating the electro-optic medium at the vanity mirror region from the electro-optic medium of the visor region. Such physical isolation eliminates the diffusion of color that may otherwise occur with only electrical isolation.

Figure 5:
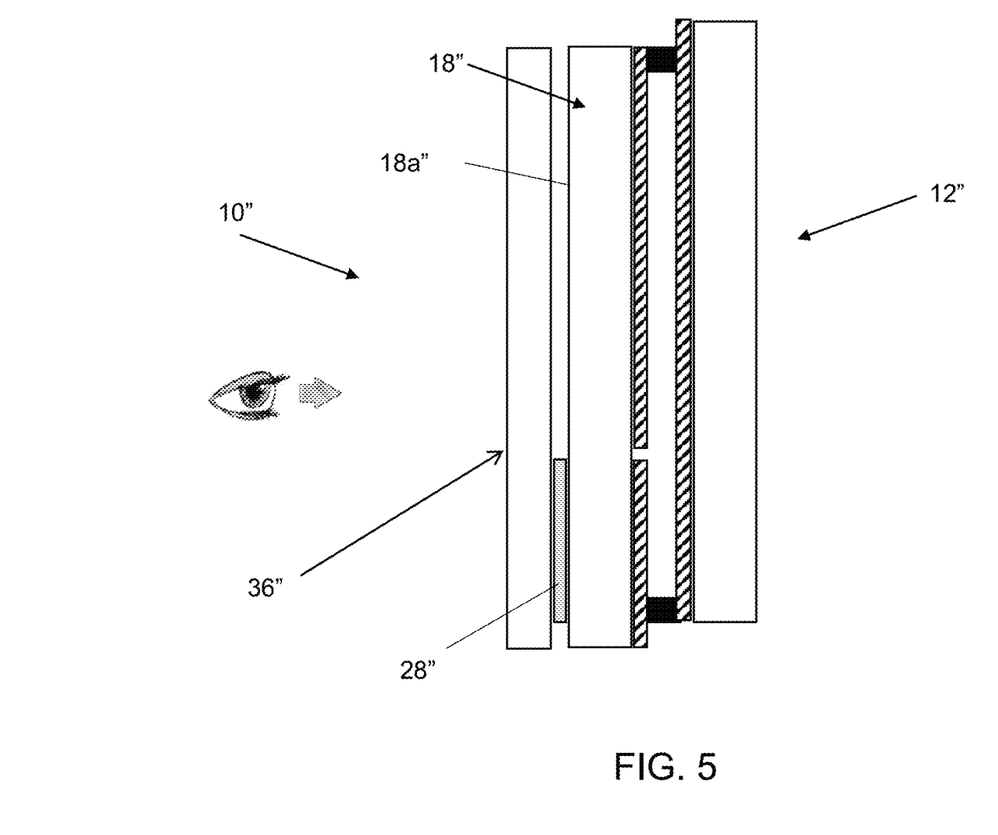
FIG. 5 is another sectional view of a sun visor and vanity mirror of the present invention, showing a laminate construction having an outer glass substrate at the front glass substrate of the electro-optic assembly.
Figure 6:
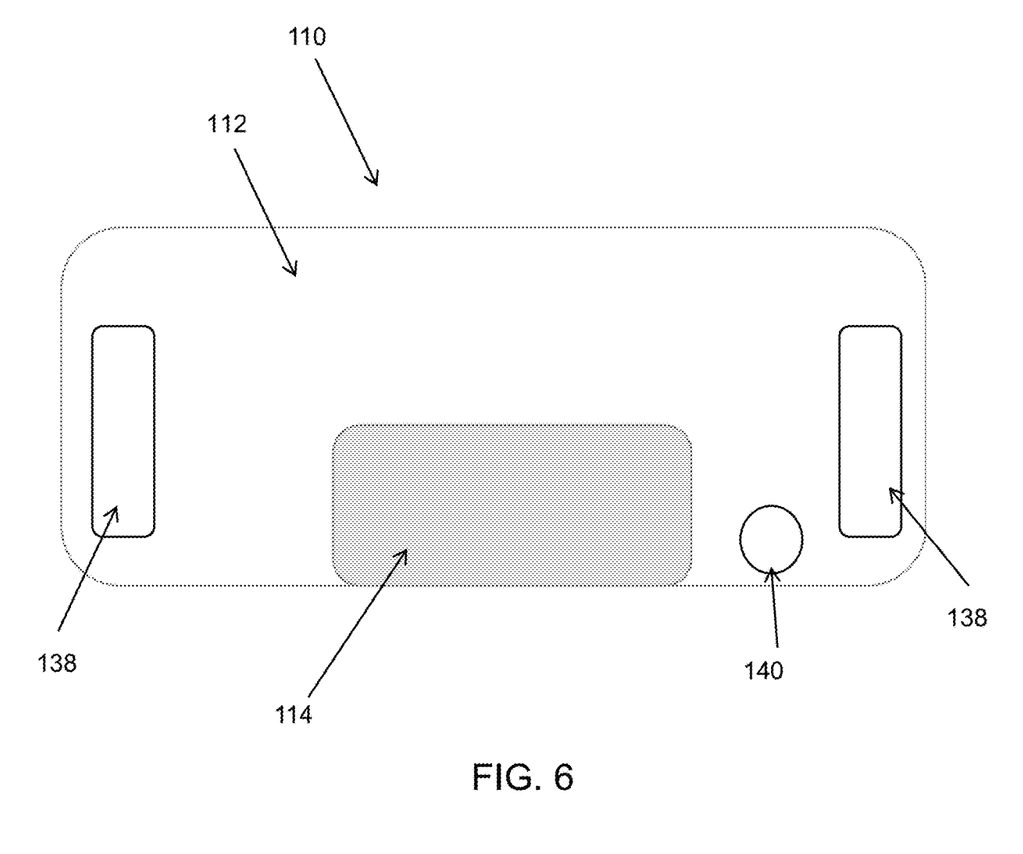
FIG. 6 is a plan view of another sun visor in accordance with the present invention, with a touch sensor input and lights.

Optionally, and such as shown in FIG. 5, a sun visor 10" may have another thin glass substrate 36" laminated to or at the front or first surface of the front glass substrate (and over the mirror reflector coating 28" at the first surface 18a" of the front glass substrate 18") of the laminate glass assembly or electro-optic cell 12". The glass assembly thus may be laminated to another glass substrate, such as for safety, and also to protect the first surface metallic mirror reflector coating or layer or film. The sun visor 10" may be otherwise substantially similar to the other sun visors described herein, such as sun visors 10, 10' discussed above, such that a discussion of the elements and function of the sun visors need not be repeated herein.

Optionally, the vanity mirror portion of the visor may comprise a separate electro-optic cell that is separate from the visor portion electro-optic cell. Thus, the visor portion cell may have a perimeter seal that circumscribes the electro-optic medium of the visor portion cell and isolates the electro-optic medium of the visor portion from the electro-optic medium of the vanity portion cell. The seal may comprise an optically clear seal between the two cells or may comprise an opaque seal between the two cells. The separate cells may then be separately powered to provide the desired darkening for the visor or the vanity mirror.

Optionally, the sun visor may include other electrical content, such as user inputs or displays or lights or the like. For example, and with reference to FIG. 8, a glass assembly or electro-optic cell 112 of a sun visor 110 may include the vanity mirror 114 and one or more lights 138 for illuminating a user's face when using the vanity mirror. The lights 138 may comprise any suitable illumination source, such as one or more light emitting diodes (LEDs) or the like disposed at or on or behind the front substrate of the sun visor. For example, the lights may comprise a light emitting element disposed at the second surface of the front substrate and electrically powered via electrically conductive traces extending from contact regions at the perimeter of the sun visor to the light elements (such as via isolation lines electrically isolating transparent electrically conductive traces between the perimeter contact regions and the light elements). For example, the light element may comprise screen-printable LEDs or thin film LEDs established on a transparent flexible substrate or element, where the flexible element may be adhered to a surface of the sun visor (such as at the rear surface of the front substrate).

Figure 8:
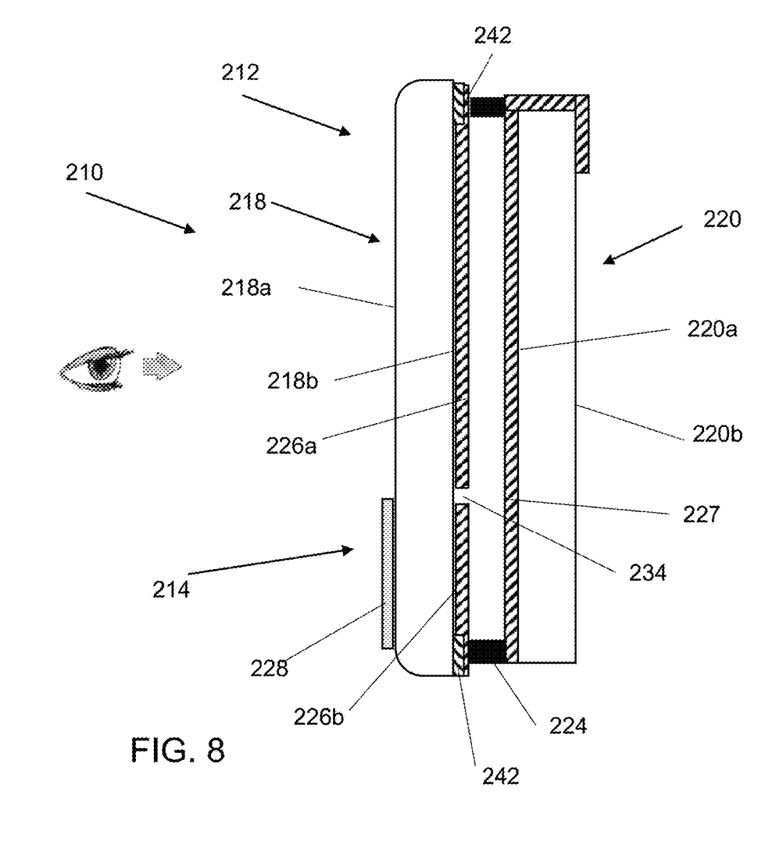
FIG. 8 is a sectional view of the sun visor of FIG. 7.

The lights may be actuated in response to actuation of a user actuatable input 140, such as a touch sensor or proximity sensor or the like, disposed at the sun visor and at or behind the front glass substrate. A user thus may activate the lights 138 by touching the front glass substrate at the user input 140 (and optionally the mirror region may darken responsive to the same user input, and optionally while the rest of the sun visor remains unpowered and substantially transparent). The user inputs may comprise any suitable inputs, and may utilize aspects of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are all hereby incorporated herein by reference in their entireties, or proximity sensors of the types described in U.S. Pat. Nos. 7,224,324; 7,249,860 and/or 7,446,924, and/or International Publication No. WO 2004/058540, which are hereby incorporated herein by reference in their entireties, or membrane type switches, such as described in U.S. Pat. No. 7,360,932, which is hereby incorporated herein by reference in its entirety, or detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like.

Optionally, one or more other user actuatable inputs or touch sensors may be disposed at or established at the sun visor. For example, a user input or touch sensor may be provided to allow the user to select whether or not the principal or sun visor region is darkened, and/or a user input or touch sensor may be provided to allow the user to select whether or not the mirror region is darkened (whereby actuation of such a vanity mirror input may energize the electro-optic medium at the mirror region 114 and behind the mirror reflector coating or layer or film so that the mirror is readily viewable and usable by the user (and optionally while the rest of the sun visor remains substantially unpowered and transparent)). A user thus may activate the vanity mirror and/or lights and/or sun visor by touching the front glass substrate at a selected or respective one of one or more user inputs 140. Optionally, the sun visor region may be automatically darkened responsive to a light or glare sensor at or near the sun visor region of the vehicle (such as at a perimeter region of the sun visor and viewing forward of the vehicle through the windshield of the vehicle), whereby the sun visor automatically darkens when there is bright light (such as from the setting or rising sun ahead of the vehicle) at the eyes of the driver and when the sun visor is flipped down to its use position. Optionally, the sun visor may be automatically flipped down and/or darkened responsive to the light sensor (with the degree of darkening being set responsive to the light sensor) or the like.

The sun visor thus comprises a substantially transparent glass substrate assembly or construction that is electrically operable to be darkened or made less transparent when flipped down to the use position. The sun visor assembly may comprise any suitable darkening means, such as an electro-optic medium, such as an electrochromic medium, or such as a liquid crystal display (LCD) device or the like, or such as any other suitable film or shade or mechanical means that causes darkening of the sun visor and/or vanity mirror region of the sun visor. For example, the sun visor assembly may comprise a shade or film that coils and uncoils between the two glass substrates (such as a shade film at the mirror region and one or more other shade films at the principal sun visor region), such as by utilizing aspects of the shade films described in U.S. Pat. No. 8,827,347 and/or International Publication Nos. WO 2014/011395 and/or WO 2012/177995, which are hereby incorporated herein by reference in their entireties.

As discussed above, the sun visor glass assembly may be encompassed or circumscribed by a casing or bezel or frame element, which is then pivotally or adjustably mounted at the header or roof of the vehicle, such as via any suitable mounting construction. Optionally, the glass assembly may comprise an exposed front substrate perimeter edge, which may be rounded and not encompassed by any bezel or frame element. For example, the glass sun visor assembly may utilize aspects of the mirror reflective elements described in International Publication Nos. WO 2010/124064; WO 2011/044312; WO 2012/051500; WO 2013/071070 and/or WO 2013/126719, which are hereby incorporated herein by reference in their entireties.

Figure 7:
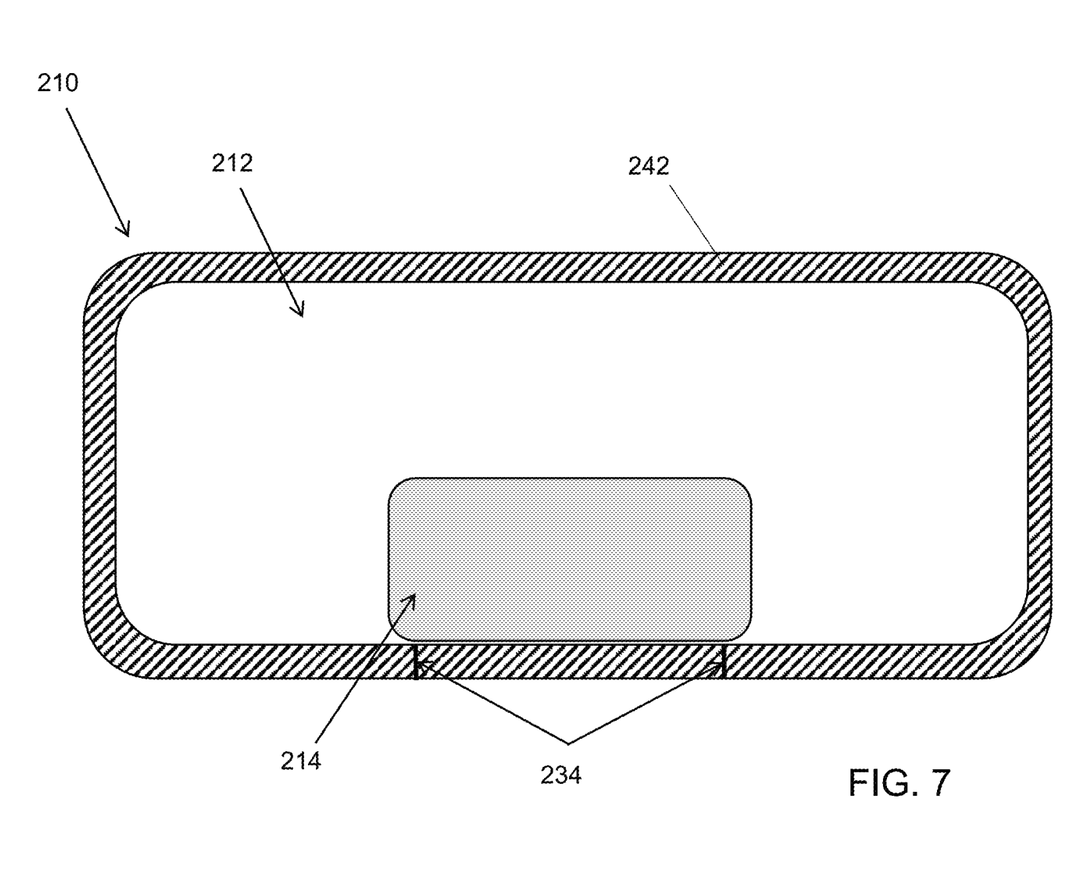
FIG. 7 is another plan view of a sun visor of the present invention, showing the electrical contacts for electrically connecting to the sun visor.

For example, and with respect to FIGS. 7 and 8, the electro-optic cell or glass assembly 212 of a sun visor 210 may include a front substrate 218 with a rounded or curved perimeter edge that overhangs the rear glass substrate (so as to provide an overhang that circumscribes the rear glass substrate. As shown in FIG. 8, the front substrate 218 may have the mirror reflector coating 228 disposed at its front or first surface 218a, with a transparent conductive coating or coatings 226a, 226b disposed at its rear or second surface 218b, such as in a similar manner as described above. A perimeter band or layer or coating 242 may be established at the second surface 218b of the front glass substrate 218, so as to hide the perimeter seal 224 from view to the driver or passenger of the vehicle when using the sun visor 210 and/or vanity mirror 214. A casing may encompass or receive the rear substrate thereat to encase the rear substrate and perimeter seal, and may or may not overlap the rear or fourth surface of the rear substrate. The casing may pivotally or adjustably attach at the vehicle, or a mounting structure may be adhered at or bonded at a portion of one of the glass substrates of the sun visor (such as an upper side corner region of the rear glass substrate), whereby the mounting structure may pivotally mount or attach the sun visor at the vehicle.

The front substrate conductive layers 226a, 226b may be electrically connected to electrical connectors or terminals or leads at the overhang regions, while the rear substrate conductive layer 227 (at the front or third surface 220a of the rear glass substrate 220) may wrap around a perimeter edge of the rear substrate 220 so be electrically connected at the rear surface 220b of the rear substrate 220. Because the front substrate 218 includes the ITO coating or layer over substantially the entirety of the rear surface 218a and includes the perimeter band coating 242, the isolation line or laser ablation 234 extends through the transparent conductive coating and into and through the perimeter band. Optionally, an electrically conductive epoxy busbar to color this portion may be provided within or between these two ablated lines for electrically powering the mirror region. The electrically conductive busbar for the principal visor portion for the front substrate would be at either side of the mirror portion and elsewhere about the periphery of the sun visor, and could be coupled via a wire harness at any suitable or desired or selected locations.

Optionally, in order to reduce segregation, the sun visor and vanity mirror assembly may comprise two electro-optic devices sandwiched or laminated together. Optionally, for example, the mirror coating may be disposed between two electro-optic devices, such that when the front device is darkened, the sun visor is darkened and attenuates light, and when the rear device is darkened behind the mirror (and the front device is bleached or not darkened), the mirror is usable as a mirror. The devices may operate such that when one darkens or colors, the other bleaches. Thus, at all times, the appearance of the devices may be at least partially darkened, but only when at least a portion of one of the devices behind the vanity mirror coating is darkened is the vanity mirror viewable and usable as a mirror. The coloring and bleaching in the two devices may be such that the minor change in light transmission through the darkened or partially darkened device would not be noticed by an average user (so the user may see the same darkened appearance when either device is darkened or partially darkened, but will also see and be able to use the mirror when one of the devices (such as the rear device) is darkened more than the other). Optionally, in order to reduce segregation, the vanity mirror assembly or device may reduce the leakage current sufficiently such that the voltage drop across the mirror is reduced. Optionally, the device may improve the recombination or bleaching by adding augmenting compounds. Another option is to move away from polymeric or solution phase systems and use a hybrid system such as a thin film device (such as using glare free mirror technology) or an all solid state window system where the reflector is replaced by a transparent conductive coating.

Thus, the present invention provides a sun visor and vanity mirror assembly that has a seamless vanity mirror at a glass, electrically darkenable sun visor. The sun visor and mirror assembly, when flipped down and not powered or energized, appears to a seamless glass surface or substrate, but when the electro-optic medium is darkened or colored behind the partially transmissive and partially transflective mirror reflector coating, the mirror reflector becomes highly visible and reflective so as to be usable as a vanity mirror. When the electro-optic medium is unpowered behind the mirror reflector, the mirror reflector is substantially transmissive and may be tinted differently than the principal sun visor region due to the different coatings or materials of the mirror reflector layer or film. The sun visor may be flipped down for use of the vanity mirror only (via selective darkening of the electro-optic medium behind the mirror reflector), where the principal sun visor region remains substantially transparent. Moreover, the sun visor may be flipped down and non-powered, whereby the sun visor is transparent and does not interfere with the user's forward field of view through the vehicle windshield.

Optionally, the sun visor region and/or the mirror region may be selectively darkened to provide darkening or coloring in a manner that darkens the mirror region to attenuate light passing therethrough without darkening to a level that the mirror becomes substantially reflective or mirrored. For example, the sun visor may include control circuitry, so that when a user selects a sun visor feature or function (without selecting a vanity mirror feature or function), the entirety of the sun visor may be darkened (with the mirror region darkened only partially so as to attenuate light at the mirror region but not to a level that causes the mirrored appearance of the mirror region), but when a user selects a vanity mirror feature or function, the mirror region may be darkened further to provide the desired vanity mirror feature or function. The thicknesses and materials of the mirror reflector and transparent conductive coatings and the degree of powering of the coatings are selected to provide the desired appearance and function of the sun visor and vanity mirror. Optionally, aspects of the present invention may be suitable for use at a window assembly, such that the window assembly may, when unpowered, be substantially transparent and, when powered, may become reflective and mirror-like. Such window assemblies may be suitable for various vehicular applications and other applications.

Optionally, aspects of the sun visor assembly of the present invention may be utilized in various applications where it may be desired to transition between a window and a mirror. There has been development towards reversible electroplating which essentially electrochemically plates a reflective metal coating on a transparent electrode. This effectively transforms a window to a mirror. Thus, this concept or the aspects of the present invention may be implemented in any application where one would benefit from a window to a mirror transition. For example, an electro-optic window may have an inset mirror (or there may be two electro-optic windows laminated together, with a mirror element or coating disposed therebetween) and the mirror would only appear to be a mirror when the electro-optic window behind the mirror darkens. Such an application may be used in windows for buildings or houses or vehicles or any application where it may be desired to selectively have a view-through window or a reflective mirror at the same location.

The sun visor may darken via any suitable means, such as via an electro-optic medium or the like. The electro-optic sun visor may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties. Optionally, the sun visor may comprise a liquid crystal display construction, and may utilize aspects of the constructions described in U.S. Publication No. US 2011-0273659, which is hereby incorporated herein by reference in its entirety.

Optionally, the sun visor may include user inputs or touch or proximity sensors as described above, and may comprise other user inputs or touch or proximity sensors for other functions, such as for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties, or such as for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; 7,657,052 and/or 6,678,614, and/or U.S. Pat. Pub. No. US-2006-0050018, which are all hereby incorporated herein by reference in their entireties.

Optionally, the sun visor may include one or more other accessories, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, transmitters and/or receivers, such as for a garage door opener or a vehicle door unlocking system or the like (such as a remote keyless entry system), an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass and/or compass display, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties). Such accessories may be disposed at or established at the sun visor glass construction if transparent or small enough so as to not interfere with the transparency of the sun visor, or may be disposed at or established at a perimeter casing or bezel of the sun visor, if applicable.

Optionally, the sun visor assembly may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A sun visor assembly for a vehicle, said sun visor assembly comprising:
   a front transparent glass substrate having first and second surfaces;
   a rear transparent glass substrate having third and fourth surfaces;
   wherein, when said sun visor assembly is disposed in a vehicle and in a use position, said front transparent glass substrate is closer to a driver of the vehicle than said rear transparent glass substrate;
   an electro-optic medium sandwiched between said second surface of said front glass substrate and said third surface of said rear glass substrate, wherein light transmission through said electro-optic medium is electrically variable;
   a partially light-reflective and partially light-transmissive mirror reflector established at a vanity mirror region of one of (i) said first surface of said front glass substrate and (ii) said second surface of said front glass substrate;
   wherein said front glass substrate comprises an exposed rounded perimeter edge, and wherein said front glass substrate extends beyond said rear glass substrate so as to provide an overhang region about the periphery of said rear glass substrate;
   wherein, when not electrically powered, said electro-optic medium is substantially transparent, and when electrically powered, said electro-optic medium is darkened so as to have reduced light transmission; and
   wherein, when said electro-optic medium behind said mirror reflector is darkened and when said sun visor assembly is in said use position, said mirror reflector at said vanity mirror region is usable as a vanity mirror by a user of said sun visor assembly.

2. The sun visor assembly of claim 1, wherein a first transparent electrically conductive coating is established at said second surface of said front glass substrate and a second transparent electrically conductive coating is established at said third surface of said rear glass substrate.

3. The sun visor assembly of claim 1, comprising at least one light that is operable to illuminate the user of said vanity mirror of said sun visor assembly.

4. The sun visor assembly of claim 1, comprising a touch sensor input at said front glass substrate, wherein said touch sensor input is actuatable by the user to control an electrical function of said sun visor assembly.

5. The sun visor assembly of claim 4, wherein said touch sensor input is operable to control at least one of (i) darkening of said electro-optic medium at a visor region of said sun visor assembly, (ii) darkening of said electro-optic medium at said vanity mirror region and behind said mirror reflector and (iii) actuating a light of said sun visor assembly.

6. The sun visor assembly of claim 1, wherein said sun visor assembly is configured to adjustably mount at a vehicle so as to be adjustable between a raised or stowed position, where said sun visor assembly is generally along the roof of the vehicle, and a lowered or use position, where said sun visor assembly is flipped down to, when said electro-optic medium is darkened, attenuate light to shield the driver's or passenger's eyes from sunlight ahead of the vehicle.

7. The sun visor assembly of claim 1, wherein said and mirror reflector is at least about 60 percent light-transmissive and at least about 20 percent reflective of light incident thereat.

8. A sun visor assembly for a vehicle, said sun visor assembly comprising:
   a front transparent glass substrate having first and second surfaces;
   a rear transparent glass substrate having third and fourth surfaces;
   wherein, when said sun visor assembly is disposed in a vehicle and in a use position, said front transparent glass substrate is closer to a driver of the vehicle than said rear transparent glass substrate;
   an electro-optic medium sandwiched between said second surface of said front glass substrate and said third surface of said rear glass substrate, wherein light transmission through said electro-optic medium is electrically variable;
   a partially light-reflective and partially light-transmissive mirror reflector established at a vanity mirror region of one of (i) said first surface of said front glass substrate and (ii) said second surface of said front glass substrate;
   wherein, when not electrically powered, said electro-optic medium is substantially transparent, and when electrically powered, said electro-optic medium is darkened so as to have reduced light transmission;
   wherein, when said electro-optic medium behind said mirror reflector is darkened and when said sun visor assembly is in said use position, said mirror reflector at said vanity mirror region is usable as a vanity mirror by a user of said sun visor assembly;
   wherein a first transparent electrically conductive coating is established at said second surface of said front glass substrate and a second transparent electrically conductive coating is established at said third surface of said rear glass substrate; and
   wherein said first transparent electrically conductive coating comprises a vanity mirror portion at said vanity mirror region and wherein said vanity mirror portion of said first transparent electrically conductive coating is electrically isolated from a visor portion of said first transparent electrically conductive coating.

9. The sun visor assembly of claim 8, wherein said vanity mirror portion of said first transparent electrically conductive coating is selectively powered to darken said electro-optic medium at said vanity mirror region and behind said mirror reflector.

10. The sun visor assembly of claim 8, wherein said visor portion of said first transparent electrically conductive coating is selectively powered to darken said electro-optic medium to attenuate light passing through a visor region of said sun visor assembly.

11. The sun visor assembly of claim 8, wherein said mirror reflector is disposed at said second surface of said front glass substrate and is at least part of said vanity mirror portion of said first transparent electrically conductive coating.

12. The sun visor assembly of claim 8, wherein said mirror reflector is disposed at said first surface of said front glass substrate.

13. The sun visor assembly of claim 8, wherein said front glass substrate comprises an exposed rounded perimeter edge, and wherein said front glass substrate extends beyond said rear glass substrate so as to provide an overhang region about the periphery of said rear glass substrate.

14. A sun visor assembly for a vehicle, said sun visor assembly comprising:
 a front transparent glass substrate having first and second surfaces;
 a rear transparent glass substrate having third and fourth surfaces;
 wherein said sun visor assembly is configured to adjustably mount at a vehicle so as to be adjustable between a non-use position, where the sun visor assembly is generally along the roof of the vehicle, and a use position, where the sun visor assembly is flipped down;
 wherein, when said sun visor assembly is disposed in the vehicle and in said use position, said front transparent glass substrate is closer to a driver of the vehicle than said rear transparent glass substrate;
 wherein a first transparent electrically conductive coating is established at said second surface of said front glass substrate and a second transparent electrically conductive coating is established at said third surface of said rear glass substrate;
 an electro-optic medium sandwiched between said first transparent electrically conductive coating at said second surface of said front glass substrate and said second transparent electrically conductive coating at said third surface of said rear glass substrate, wherein light transmission through said electro-optic medium is electrically variable;
 wherein said sun visor assembly comprises a visor region and a vanity mirror region;
 wherein said first transparent electrically conductive coating comprises a vanity mirror portion at said vanity mirror region and a visor portion at said visor region, and wherein said vanity mirror portion of said first transparent electrically conductive coating is electrically isolated from said visor portion of said first transparent electrically conductive coating via an isolation gap between said vanity mirror portion of said first transparent electrically conductive coating and said visor portion of said first transparent electrically conductive coating;
 wherein a sealing element is disposed along said isolation gap to physically separate the electro-optic medium at said visor portion from the electro-optic medium at said vanity mirror portion;
 a partially light-reflective and partially light-transmissive mirror reflector established at said vanity mirror region of one of (i) said first surface of said front glass substrate and (ii) said second surface of said front glass substrate;
 wherein, when not electrically powered, said electro-optic medium is substantially transparent, and wherein, when electrically powered, said electro-optic medium is darkened so as to have reduced light transmission;
 wherein, when said sun visor assembly is in said use position and when said visor portion of said first transparent electrically conductive coating is powered to darken said electro-optic medium at said visor region, said visor region of said sun visor assembly attenuates light to shield the driver's or passenger's eyes from sunlight ahead of the vehicle; and
 wherein, when said sun visor assembly is in said use position and when said vanity mirror portion of said first transparent electrically conductive coating is powered to darken said electro-optic medium at said vanity mirror region, said mirror reflector at said vanity mirror region is usable as a vanity mirror by a user of said sun visor assembly.

15. The sun visor assembly of claim 14, wherein said mirror reflector is disposed at said second surface of said front glass substrate and is at least part of said vanity mirror portion of said first transparent electrically conductive coating.

16. The sun visor assembly of claim 14, wherein said mirror reflector is disposed at said first surface of said front glass substrate.

17. The sun visor assembly of claim 14, comprising a touch sensor input at said front glass substrate, wherein said touch sensor input is actuatable by the user to control an electrical function of said sun visor assembly, and wherein said touch sensor input is operable to control at least one of (i) darkening of said electro-optic medium at a principal visor region of said sun visor assembly, (ii) darkening of said electro-optic medium at said vanity mirror region and behind said mirror reflector and (iii) actuating a light of said sun visor assembly.

18. A sun visor assembly for a vehicle, said sun visor assembly comprising:
 a front transparent glass substrate having first and second surfaces;
 a rear transparent glass substrate having third and fourth surfaces;
 wherein said sun visor assembly is configured to adjustably mount at a vehicle so as to be adjustable between a non-use position, where the sun visor assembly is generally along the roof of the vehicle, and a use position, where the sun visor assembly is flipped down;
 wherein, when said sun visor assembly is disposed in a vehicle and in said use position, said front transparent glass substrate is closer to a driver of the vehicle than said rear transparent glass substrate;
 wherein a first transparent electrically conductive coating is established at said second surface of said front glass substrate and a second transparent electrically conductive coating is established at said third surface of said rear glass substrate;
 an electro-optic medium sandwiched between said first transparent electrically conductive coating at said second surface of said front glass substrate and said second transparent electrically conductive coating at said third surface of said rear glass substrate, wherein light transmission through said electro-optic medium is electrically variable;
 a partially light-reflective and partially light-transmissive mirror reflector established at a vanity mirror region of one of (i) said first surface of said front glass substrate and (ii) said second surface of said front glass substrate;
 wherein said front glass substrate comprises an exposed rounded perimeter edge, and wherein said front glass substrate extends beyond said rear glass substrate so as to provide an overhang region about the periphery of said rear glass substrate;
 wherein, when not electrically powered, said electro-optic medium is substantially transparent, and when electrically powered, said electro-optic medium is darkened so as to have reduced light transmission;

wherein, when said sun visor assembly is in said use position and when said first transparent electrically conductive coating is powered to darken said electro-optic medium at least at said vanity mirror region, said mirror reflector at said vanity mirror region is usable as a vanity mirror by a user of said sun visor assembly; and wherein said sun visor assembly comprises at least one light that is operable to illuminate the user of the vanity mirror of said sun visor assembly.

19. The sun visor assembly of claim 18, comprising a touch sensor input at said front glass substrate, wherein said touch sensor input is actuatable by the user to control an electrical function of said sun visor assembly, and wherein said touch sensor input is operable to control at least one of (i) darkening of said electro-optic medium at a principal visor region of said sun visor assembly, (ii) darkening of said electro-optic medium at said vanity mirror region and behind said mirror reflector and (iii) actuating a light of said sun visor assembly.

20. The sun visor assembly of claim 18, wherein said and mirror reflector is at least about 60 percent light-transmissive and at least about 20 percent reflective of light incident thereat.

* * * * *

UNITED STATES PATENT AND TRADEMARK OFFICE
CERTIFICATE OF CORRECTION

PATENT NO. : 10,227,046 B2
APPLICATION NO. : 14/921109
DATED : March 12, 2019
INVENTOR(S) : Hamid Habibi It is certified that error appears in the above-identified patent and that said Letters Patent is hereby corrected as shown below:

In the Specification

Column 3
Line 15, "(10)" should be --(IO)--

Signed and Sealed this
Sixteenth Day of April, 2019

Andrei Iancu
*Director of the United States Patent and Trademark Office*